(12) United States Patent
Takahashi et al.

(10) Patent No.: US 10,637,594 B2
(45) Date of Patent: Apr. 28, 2020

(54) RECEPTION DEVICE, TRANSMISSION DEVICE, AND DATA PROCESSING METHOD

(71) Applicant: SONY SEMICONDUCTOR SOLUTIONS CORPORATION, Atsugi-shi (JP)

(72) Inventors: Kazuyuki Takahashi, Chiba (JP); Satoshi Okada, Tokyo (JP); Lachlan Bruce Michael, Saitama (JP)

(73) Assignee: SONY SEMICONDUCTOR SOLUTIONS CORPORATION, Atsugi-shi (JP)

(*) Notice: Subject to any disclaimer, the term of this patent is extended or adjusted under 35 U.S.C. 154(b) by 0 days.

(21) Appl. No.: 16/099,597

(22) PCT Filed: Jun. 23, 2017

(86) PCT No.: PCT/JP2017/023148
§ 371 (c)(1),
(2) Date: Nov. 7, 2018

(87) PCT Pub. No.: WO2018/008428
PCT Pub. Date: Jan. 11, 2018

(65) Prior Publication Data
US 2019/0149254 A1 May 16, 2019

(30) Foreign Application Priority Data

Jul. 8, 2016 (JP) ................................ 2016-135711

(51) Int. Cl.
*H04H 20/31* (2008.01)
*H04J 11/00* (2006.01)
(Continued)

(52) U.S. Cl.
CPC ............... *H04H 20/31* (2013.01); *H04B 1/16* (2013.01); *H04B 1/1638* (2013.01);
(Continued)

(58) Field of Classification Search
CPC ........ H04H 20/31; H04H 20/93; H04H 60/73; H04B 1/1638; H04B 1/16; H04N 21/435;
(Continued)

(56) References Cited

U.S. PATENT DOCUMENTS

2009/0175372 A1* 7/2009 Moon ................. H04L 27/2602
  375/260
2010/0184424 A1* 7/2010 Yi ......................... H04W 28/06
  455/422.1
(Continued)

FOREIGN PATENT DOCUMENTS

| EP | 2 541 906 A2 | 1/2013 |
|---|---|---|
| JP | 2016-116180 A | 6/2016 |
| WO | WO 2016/063731 A1 | 4/2016 |

OTHER PUBLICATIONS

International Search Report dated Sep. 19, 2017 in PCT/JP2017/023148, 1 page.
(Continued)

*Primary Examiner* — Jean B Corrielus
(74) *Attorney, Agent, or Firm* — Oblon, McClelland, Maier & Neustadt, L.L.P.

(57) ABSTRACT

The present technology relates to a reception device, a transmission device, and a data processing method with which it becomes possible to operate digital television broadcasting more flexibly. A reception device receives a broadcast signal transmitted by frequency division multiplexing (FDM) and processes, on the basis of control information existence information that is information included in first control information, which is acquired from the broadcast signal and is control information in a physical layer, and that indicates existence/non-existence of second control information that is control information in an upper layer of the physical layer, the second control information transmitted in each hierarchy. The present technology can be applied, for example, to a receiver that can receive digital television broadcasting.

18 Claims, 16 Drawing Sheets

(51) Int. Cl.
*H04J 1/00* (2006.01)
*H04N 21/235* (2011.01)
*H04N 21/435* (2011.01)
*H04H 60/73* (2008.01)
*H04B 1/16* (2006.01)
*H04H 20/93* (2008.01)
*H04J 1/08* (2006.01)

(52) U.S. Cl.
CPC ............ *H04H 20/93* (2013.01); *H04H 60/73* (2013.01); *H04J 1/00* (2013.01); *H04J 1/08* (2013.01); *H04J 11/00* (2013.01); *H04N 21/235* (2013.01); *H04N 21/435* (2013.01)

(58) Field of Classification Search
CPC . H04N 21/235; H04J 11/00; H04J 1/00; H04J 1/08
See application file for complete search history.

(56) References Cited

U.S. PATENT DOCUMENTS

| 2015/0071153 | A1* | 3/2015 | Hong | H04L 5/0023 370/311 |
| 2016/0198023 | A1* | 7/2016 | Kwon | H04L 61/2007 |
| 2018/0124436 | A1* | 5/2018 | Takahashi | H04N 21/236 |

OTHER PUBLICATIONS

"Transmission System for Digital Terrestrial Television Broadcasting", ARIB Standard, ARIB STD-B31, 2.2, Mar. 18, 2014, (with English Translation), 419 pages.

Extended European Search Report dated Apr. 24, 2019 in Patent Application No. 17824035.4, 7 pages.

Office Action dated Jan. 15, 2020 in Chinese Patent Application No. 201760041159.3 with English translation.

* cited by examiner

FIG. 7

| Syntax | No of Bits | Mnemonic | Semantics |
|---|---|---|---|
| Offset_TLV_packet | 13 | uimsbf | OFFSET OF PACKET FROM FRAME HEAD (UNIT OF Bytes) |
| NUM_LAYER | 6 | uimsbf | NUMBER OF HIERARCHY (CASE OF UP TO 64 HIERARCHY) |
| for (i=0;i<NUM_LAYER;i++) { | | | |
| num_segment | 6 | uimsbf | NUMBER OF SEGMENT IN HIERARCHY |
| layer_fft_size | 2 | uimsbf | FFT SIZE |
| layer_mod | 3 | uimsbf | CARRIER MODULATION SYSTEM |
| layer_cod | 3 | uimsbf | CODE RATE OF ERROR CORRECTION |
| layer_gi | 3 | uimsbf | GUARD INTERVAL |
| packet_type | 3 | uimsbf | KIND OF TRANSMITTED DATA |
| tlv_si_exist_flag | 1 | bslbf | FLAG INDICATING THAT TLV_SI (TLV_NIT/AMT) IS INCLUDED IN HIERARCHY |
| } | | | |
| Parity | var | bslbf | PARITY (PARITY LENGTH DESIGNATED BY LEN_TMCC_Parity) |

FIG. 8

| layer_fft_size | FFT Size |
|---|---|
| 0 | 8K |
| 1 | 16K |
| 2 | 32K |
| 3 | reserved |

FIG. 9

| layer_mod | Modulation |
|---|---|
| 0 | QPSK |
| 1 | 16QAM |
| 2 | 64QAM-NUC |
| 3 | 256QAM-NUC |
| 4 | 1024QAM-NUC |
| 5 | 4096QAM-NUC |
| 6..7 | Reserved |

FIG. 10

| layer_cod | Code Rate |
|---|---|
| 0 | 1/2 |
| 1 | 2/3 |
| 2 | 3/4 |
| 3 | 5/6 |
| 4 | 7/8 |
| 5..7 | Reserved |

FIG. 11

| layer_gi | Guard Interval |
|---|---|
| 0 | 1/4 |
| 1 | 1/8 |
| 2 | 1/16 |
| 3 | 1/32 |
| 4..7 | Reserved |

FIG. 12

| packet_type | KIND OF DATA |
|---|---|
| 0 | MPEG2-TS |
| 1 | TLV/MMT |
| 2..7 | Reserved |

FIG. 13

| Syntax | No of Bits | Mnemonic | Semantics |
|---|---|---|---|
| SYNC | 16 | bslbf | SYNCHRONIZATION SIGNAL TO DETECT HEAD OF FRAME |
| LEN_TMCC | 8 | uimsbf | LENGTH OF TMCC (CORRESPONDING TO TMCC OF UP TO 256 BIT. TMCC IS NOT INCLUDED IN CASE OF 0) |
| LEN_TMCC_Parity | 8 | uimsbf | PARITY LENGTH OF TMCC (CORRESPONDING UP TO 256 BIT) |
| Parity | 16 | uimsbf | PARITY |

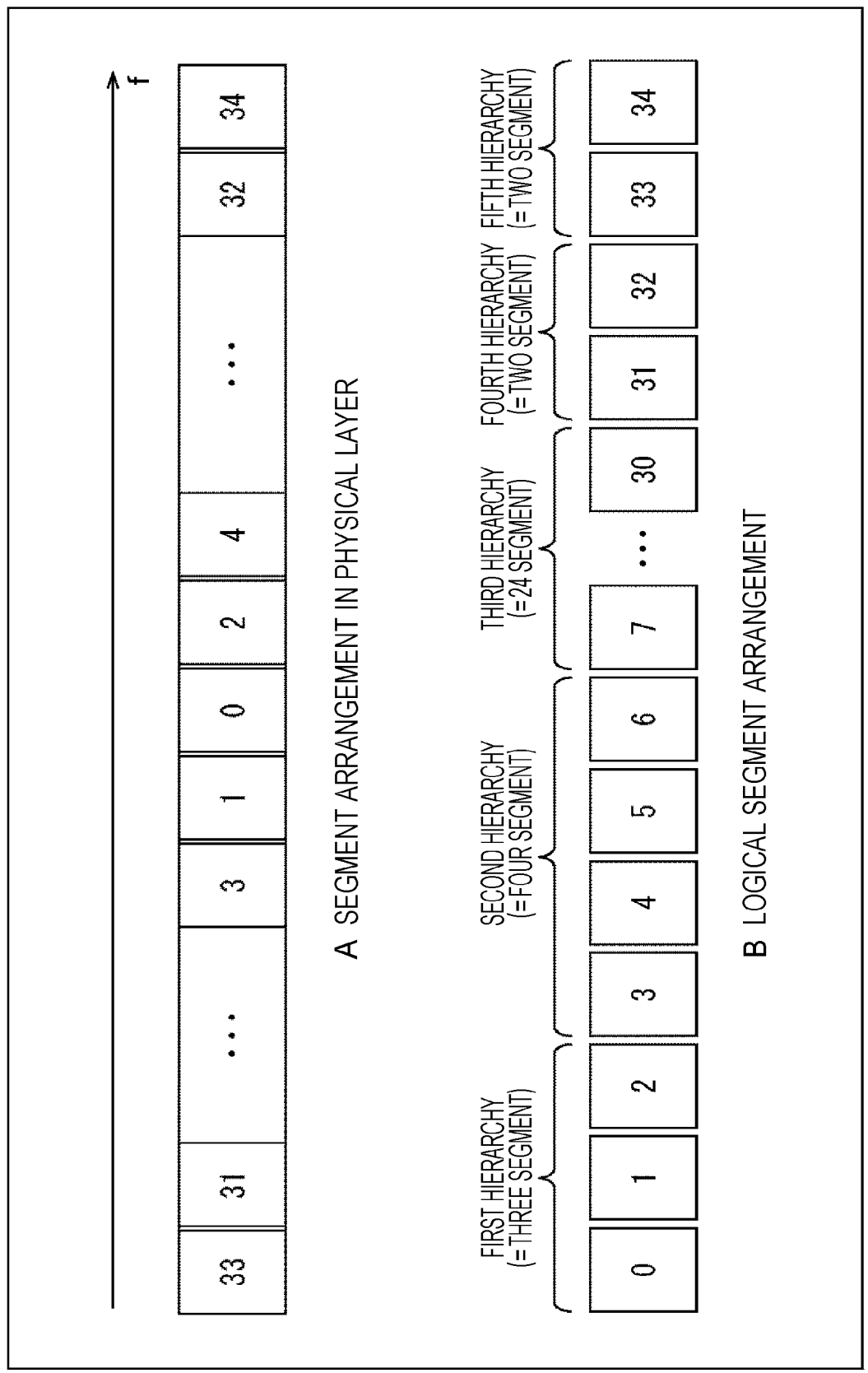

FIG. 15

| Syntax | No of Bits | Mnemonic | Semantics |
|---|---|---|---|
| Offset_TLV_packet | 13 | uimsbf | OFFSET OF PACKET FROM FRAME HEAD (UNIT OF Bytes) |
| NUM_LAYER | 6 | uimsbf | NUMBER OF HIERARCHY (CASE OF UP TO 64 HIERARCHY) |
| for(i=0;i<NUM_LAYER;i++) { | | | |
| num_segment | 35 | bslbf | MAKE DESIGNATION IN UNIT OF SEGMENT IN HIERARCHY |
| layer_fft_size | 2 | uimsbf | FFT SIZE |
| layer_mod | 3 | uimsbf | CARRIER MODULATION SYSTEM |
| layer_cod | 3 | uimsbf | CODE RATE OF ERROR CORRECTION |
| layer_gi | 3 | uimsbf | GUARD INTERVAL |
| packet_type | 3 | uimsbf | KIND OF TRANSMITTED DATA |
| tlv_si_exist_flag | 1 | bslbf | FLAG INDICATING THAT TLV_SI(TLV_NIT/AMT) IS INCLUDED IN HIERARCHY |
| } | | | |
| Parity | var | bslbf | PARITY |

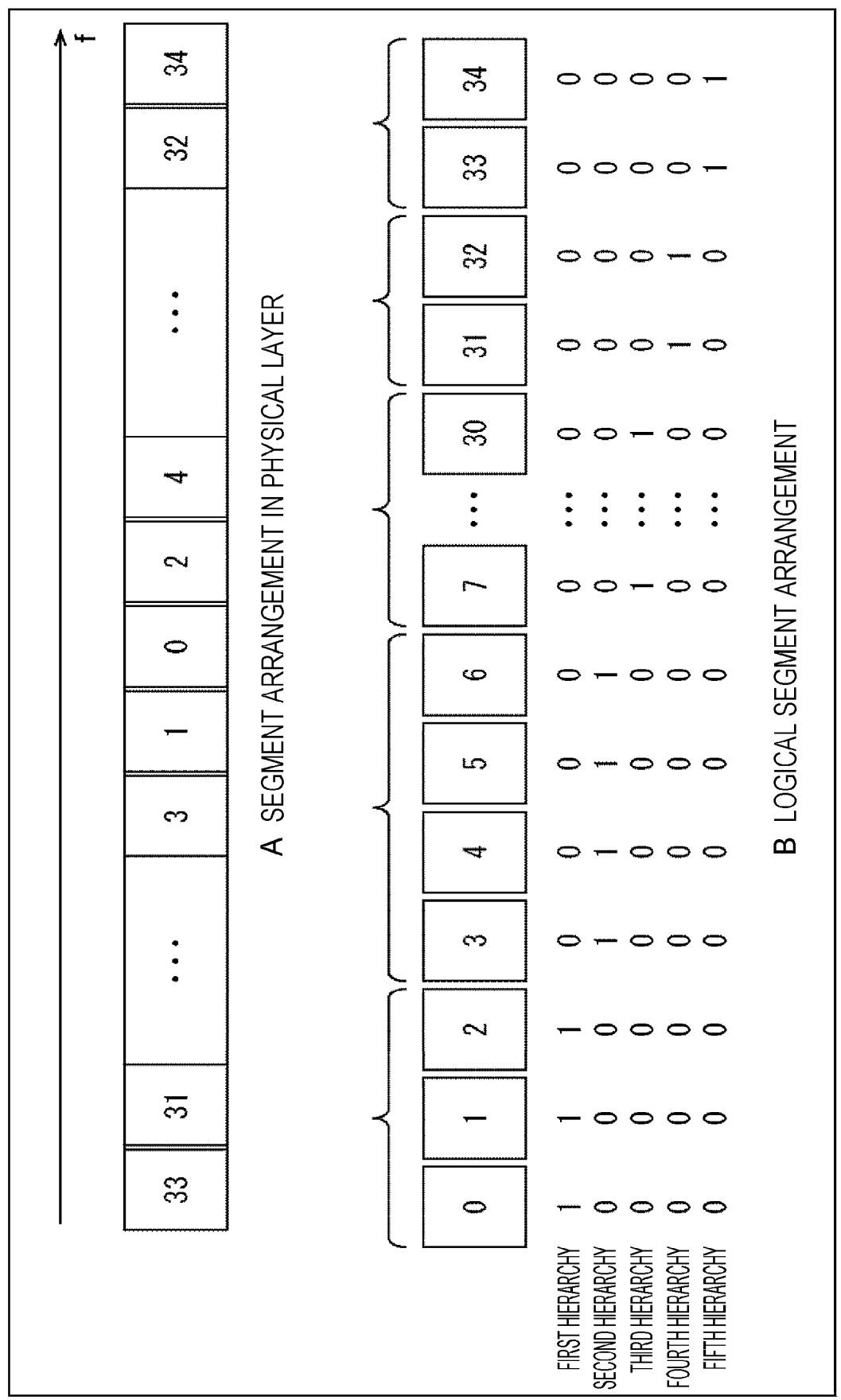

RECEPTION DEVICE, TRANSMISSION DEVICE, AND DATA PROCESSING METHOD

TECHNICAL FIELD

The present technology relates to a reception device, a transmission device, and a data processing method and specifically relates to a reception device, a transmission device, and a data processing method with which it is possible to operate digital television broadcasting more flexibly.

BACKGROUND ART

For example, in integrated services digital broadcasting-terrestrial (ISDB-T) employed in Japan and the like as a broadcasting system of terrestrial digital television broadcasting, transmission multiplexing configuration control (TMCC) is prescribed as control information in a physical layer (see, for example, Non-Patent Document 1).

CITATION LIST

Non-Patent Document

Non-Patent Document 1: ARIB STD-B31 2.2 version, Association of Radio Industries and Businesses

SUMMARY OF THE INVENTION

Problems to be Solved by the Invention

Incidentally, along with extension of an existing broadcasting system, a proposal to make it possible to operate digital television broadcasting more flexibly by extending control information in a physical layer is requested.

The present technology is provided in view of such a situation and is to make it possible to operate digital television broadcasting more flexibly.

Solutions to Problems

A reception device of a first aspect of the present technology is a reception device including: a reception unit configured to receive a broadcast signal transmitted by frequency division multiplexing (FDM); and a processing unit configured to process, on the basis of control information existence information that is information included in first control information, which is acquired from the broadcast signal and is control information in a physical layer, and that indicates existence/non-existence of second control information that is control information in an upper layer of the physical layer, the second control information transmitted in each hierarchy.

The reception device of the first aspect of the present technology may be an independent device or an internal block included in one device. Furthermore, a data processing method of the first aspect of the present technology is a data processing method corresponding to the above-described reception device of the first aspect of the present technology.

In the reception device and the data processing method of the first aspect of the present technology, a broadcast signal transmitted by frequency division multiplexing (FDM) is received, and on the basis of control information existence information that is information included in first control information, which is acquired from the broadcast signal and is control information in a physical layer, and that indicates existence/non-existence of second control information that is control information in an upper layer of the physical layer, the second control information transmitted in each hierarchy is processed.

A transmission device of a second aspect of the present technology is a transmission device including: a generation unit configured to generate first control information that is control information in a physical layer and that includes control information existence information indicating existence/non-existence of second control information that is control information in an upper layer of the physical layer; and a transmission unit configured to transmit a broadcast signal including the first control information and the second control information by frequency division multiplexing (FDM).

The transmission device of the second aspect of the present technology may be an independent device or an internal block included in one device. Furthermore, a data processing method of the second aspect of the present technology is a data processing method corresponding to the above-described transmission device of the second aspect of the present technology.

In the transmission device and the data processing method of the second aspect of the present technology, first control information that is control information in a physical layer and that includes control information existence information indicating existence/non-existence of second control information that is control information in an upper layer of the physical layer is generated, and a broadcast signal including the first control information and the second control information is transmitted by frequency division multiplexing (FDM).

Effects of the Invention

According to the first aspect and the second aspect of the present technology, it is possible to operate digital television broadcasting more flexibly.

Note that an effect described herein is not necessarily limited and may be any of the effects described in the present disclosure.

BRIEF DESCRIPTION OF DRAWINGS

FIG. 7 is a chart illustrating an example of syntax of present-technology TMCC information.

FIG. 8 is a chart illustrating an example of an FFT size.

FIG. 9 is a chart illustrating an example of a carrier modulation system.

FIG. 10 is a chart illustrating an example of a code rate of error correction.

FIG. 11 is a chart illustrating an example of a guard interval.

FIG. 12 is a chart illustrating an example of a kind of transmission data.

FIG. 13 is a chart illustrating an example of syntax of TMCC length information.

FIG. 14 is a view illustrating a relationship between a segment and a hierarchy in a case where the present-technology TMCC information in FIG. 7 is used.

FIG. 15 is a chart illustrating a different example of syntax of present-technology TMCC information.

FIG. 16 is a view illustrating a relationship between a segment and a hierarchy in a case where the present-technology TMCC information in FIG. 15 is used.

MODE FOR CARRYING OUT THE INVENTION

Figure 1:
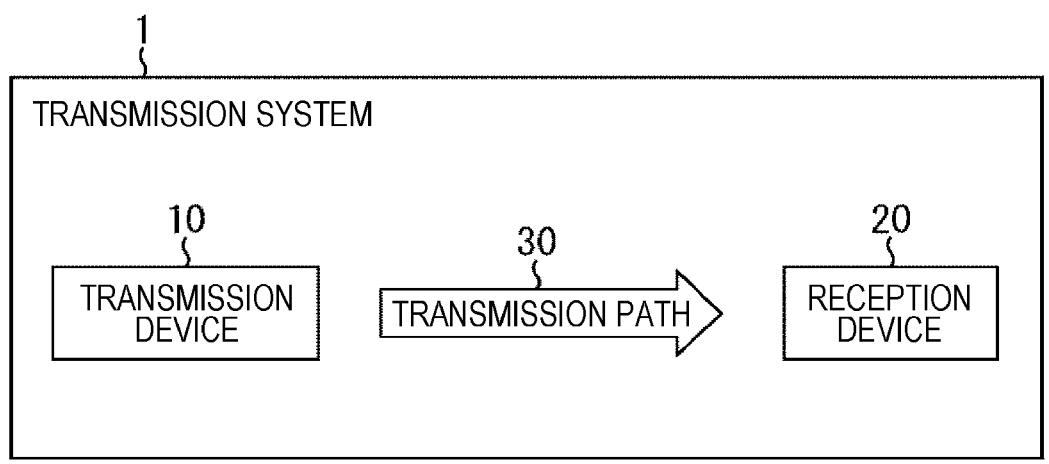
FIG. 1 is a view illustrating a configuration of an embodiment of a transmission system to which the present technology is applied.

In the following, an embodiment of the present technology will be described with reference to the drawings. Note that the description will be made in the following order.

1. Configuration of system
2. Outline of present technology
3. Control information in physical layer of present technology
4. Flow of present-technology TMCC information correspondence processing
5. Modification example
6. Configuration of computer 1. Configuration of System (Configuration Example of Transmission System)

FIG. 1 is a view illustrating a configuration of an embodiment of a transmission system to which the present technology is applied. Note that a system means a logical aggregation of a plurality of devices.

In FIG. 1, a transmission system 1 includes a transmission device 10 and a reception device 20. In this transmission system 1, data transmission compliant with a predetermined broadcasting system is performed.

The transmission device 10 is a transmitter corresponding to a predetermined broadcasting system and transmits content through a transmission path 30. For example, the transmission device 10 transmits, as a broadcast wave, a broadcast stream including data of a video, sound, and caption of content such as a broadcast program and control information though the transmission path 30.

The reception device 20 is a receiver corresponding to a predetermined broadcasting system and receives/outputs content transmitted from the transmission device 10 through the transmission path 30. For example, the reception device 20 receives a broadcast wave from the transmission device 10 and reproduces a video and sound of content such as a broadcast program by processing data of a video, sound, and caption and control information that are included in the broadcast stream.

Note that in the transmission system 1, other than a ground wave (terrestrial broadcasting), the transmission path 30 may be, for example, satellite broadcasting using broadcasting satellite (BS) or communications satellite (CS), cable broadcasting (CATV) using a cable, or the like.

(Configuration Example of Transmission Device)

Figure 2:
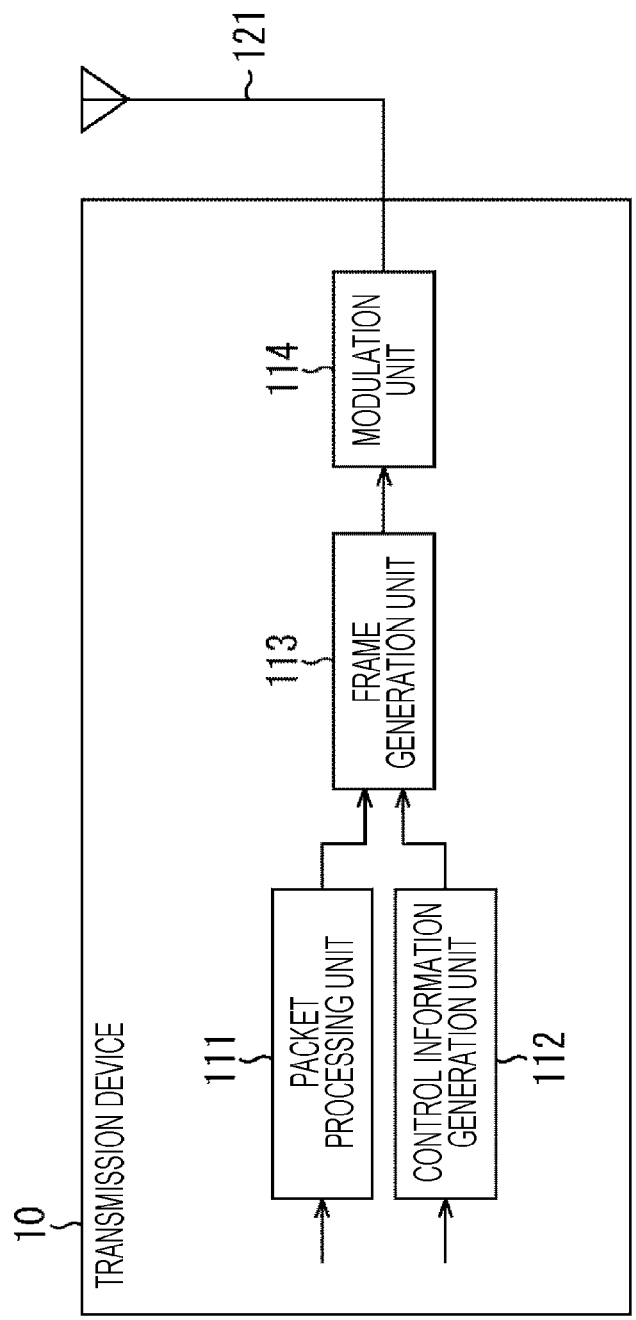
FIG. 2 is a view illustrating a configuration example of a transmission device.

FIG. 2 is a view illustrating a configuration example of the transmission device 10 in FIG. 1.

In FIG. 2, the transmission device 10 includes a packet processing unit 111, a control information generation unit 112, a frame generation unit 113, and a modulation unit 114.

The packet processing unit 111 processes a packet storing data of a video, sound, caption, and the like of content and supplies this to the frame generation unit 113.

Note that the packet processing unit 111 can include control information in an upper layer, time information, or the like into a packet. Here, the upper layer means an upper layer of the physical layer in a protocol stack of terrestrial digital television broadcasting.

The control information generation unit 112 generates control information in the physical layer to perform demodulation processing, decoding processing, or the like on a reception side and supplies this to the frame generation unit 113.

The frame generation unit 113 generates a frame of a physical layer (physical layer frame) compliant with a predetermined broadcasting system by processing a packet supplied from the packet processing unit 111 and control information supplied from the control information generation unit 112, and supplies this to the modulation unit 114.

The modulation unit 114 performs necessary processing (modulation processing) with respect to the physical layer frame supplied from the frame generation unit 113 and transmits, through an antenna 121, a broadcast signal acquired thereby.

The transmission device 10 is configured in the above manner. Note that in FIG. 2, for the convenience in description, illustration is made as if the transmission device 10 includes one device. However, the transmission device 10 on a transmission side can be a system including a plurality of devices having functions of blocks in FIG. 2.

(Configuration Example of Reception Device)

Figure 3:
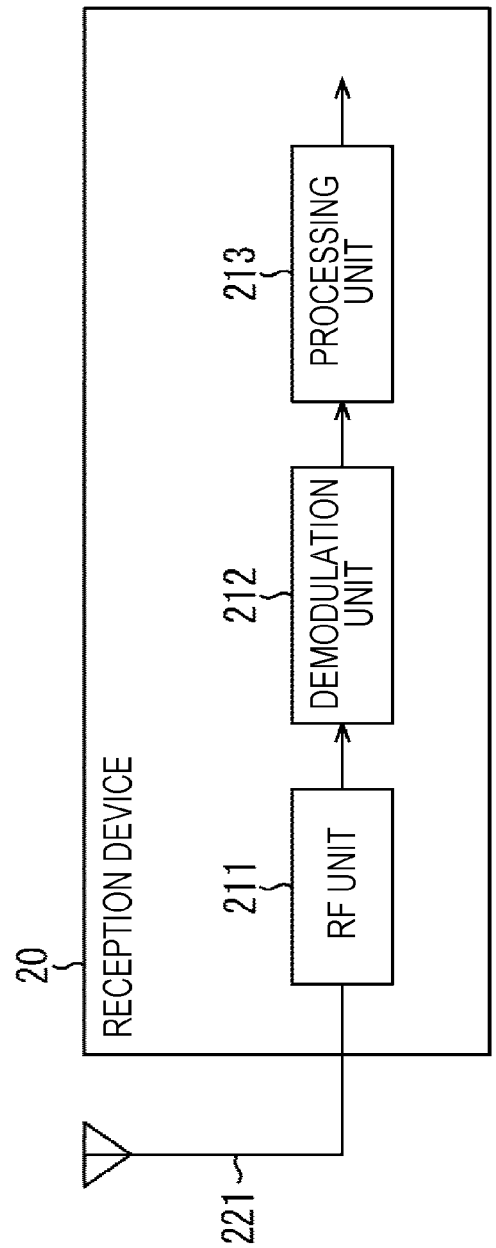
FIG. 3 is a view illustrating a configuration example of a reception device.

FIG. 3 is a view illustrating a configuration example of the reception device 20 in FIG. 1.

In FIG. 3, the reception device 20 includes an RF unit 211, a demodulation unit 212, and a processing unit 213.

The RF unit 211 includes, for example, a tuner or the like. The RF unit 211 performs necessary processing with respect to a broadcast signal received through an antenna 221 and supplies, to the demodulation unit 212, a signal acquired thereby.

The demodulation unit 212 includes, for example, demodulation large scale integration (LSI) or the like. The demodulation unit 212 performs demodulation processing with respect to the signal supplied from the RF unit 211. In this demodulation processing, for example, a physical layer frame is processed according to control information in a physical layer, and a packet is acquired. The packet acquired in the demodulation processing is supplied to the processing unit 213.

The processing unit 213 includes, for example, a main system on chip (SoC) or the like. The processing unit 213 performs predetermined processing with respect to the packet supplied from the demodulation unit 212. Here, for example, channel-selecting processing or the like is performed on the basis of control information in an upper layer which information is included in the packet.

Decoding processing or the like is performed by a circuit in the following stage with respect to data of a video, sound, caption, and the like acquired in the processing by the processing unit 213, and a video and sound acquired as a result thereof are output. With this arrangement, in the reception device 20, content such as a broadcast program is reproduced and a video and sound thereof are output.

The reception device 20 is configured in the above manner. Note that the reception device 20 is configured, for example, as a fixed receiver such as a television receiver or a set top box (STB) or as a mobile receiver, in which a tuner is mounted, such as a mobile phone or a smartphone. Furthermore, the reception device 20 may be an in-vehicle device mounted in a vehicle.

2. Outline of Present Technology

Incidentally, in Japan, ISDB-T is employed as a broadcasting system of terrestrial digital television broadcasting (see, for example, Non-Patent Document 1 described above).

In ISDB-T, high-definition television broadcasting that is broadcasting mainly for a fixed receiver and that uses 12 segments, and "one segment part reception service for a mobile phone/mobile terminal" (one-seg broadcasting) that is broadcasting mainly for a mobile receiver and that uses one segment are prescribed.

On the other hand, consideration for advancement of terrestrial digital television broadcasting to the next generation is started in Japan (hereinafter, this standard considered to be advanced is also referred to as "ISDB-T2").

In existing ISDB-T, frequency division multiplexing (FDM) is employed as a system of multiplexing a broadcast signal. It is assumed that frequency division multiplexing (FDM) is also employed similarly in ISDB-T2 in the next generation.

In a case where frequency division multiplexing (FDM) is employed, a predetermined frequency band (such as 6 MHz) is divided into a plurality of segments and hierarchy transmission using a band of each one or plurality of segments is performed. In this case, for example, data of different services can be respectively transmitted in hierarchies each of which has a frequency band of one or a plurality of segments acquired by the frequency division.

In other words, each hierarchy is a unit aggregating one or a plurality of segments. Note that an OFDM segment is used in ISDB-T. Here, in orthogonal frequency division multiplexing (OFDM), many orthogonal subcarriers are provided in a transmission band and digital modulation is performed.

Furthermore, in ISDB-T2 in the next generation, transmission multiplexing configuration control (TMCC) is to be prescribed as new control information (signaling) in a physical layer similarly to existing ISDB-T. This TMCC information is transmission control information to perform demodulation processing, decoding processing, or the like in a reception device 20 in hierarchy transmission in which a plurality of transmission parameters (modulation parameter) is mixed.

Furthermore, while an MPEG2-transport stream (TS) system that is currently spread widely is employed as a transmission system in existing ISDB-T, it is expected to provide a more advanced service by introducing an Internet protocol (IP) system in which an IP packet used in a communication field is applied to digital television broadcasting for a purpose of cooperation between broadcasting and communication in ISDB-T2 in the next generation.

In a case where this IP system is employed, it is assumed that a type length value (TLV) packet to transmit an IP packet through a broadcasting transmission path is used. The TLV packet is a packet having a variable length and has a size of 4 to 65536 bytes, for example. The TLV packet stores an IP packet. Furthermore, in a case where the IP system is employed, it is assumed that MPEG media transport (MMT) to transmit multimedia content by using various networks such as broadcasting, communication, and the like is used as a media transport system.

In other words, by utilization of MMT, data of a video, sound, caption, control information, application, content, and the like is stored into an IP packet, the IP packet is encapsulated in a TLV packet, and a TLV stream acquired thereby is transmitted as a broadcast wave. In the following, a system of using MMT as a transport protocol of such an IP system is also referred to as a TLV/MMT system.

Note that a media transport system by MMT is prescribed, for example, in Non-Patent Document 2 in the following. In Non-Patent Document 2, two kinds of control information (signaling Information (SI)) that are TLV-SI and MMT-SI are prescribed as control information in an upper layer of a physical layer.

TLV-SI is control information related to TLV multiplexing system for multiplexing of an IP packet. TLV-SI includes, for example, a TLV-network information table (NIT), an address map table (AMT), and the like. TLV-NIT is information to associate, in transmission by a TLV packet, information of a transmission path such as modulation frequency with a broadcast program. AMT is information to associate a service identifier, which is for identification of a broadcast program number, with an IP packet. Note that MMT-SI is control information related to MMT that is a media transport system. MMT-SI includes information indicating a configuration of a broadcast program, or the like.
Non-Patent Document 2: ARIB STD-B60 1.6 version, Association of Radio Industries and Businesses As described above, it is considered to extend and advance a broadcasting system of existing terrestrial digital television broadcasting as a broadcasting system of terrestrial digital television broadcasting in the next generation. Along with the extension, a proposal to make it possible to operate digital television broadcasting more flexibly is requested. The present technology is to make it possible to operate digital television broadcasting more flexibly in order to respond to such a request.

For example, since TMCC information prescribed by existing ISDB-T has no information that is related to control information in an upper layer (such as TLV-SI) and that is transmitted in each hierarchy, processing such as channel-selecting processing in channel selection cannot be performed effectively. Thus, in the present technology, information indicating existence/non-existence of control information in an upper layer (such as TLV-SI) (control information existence information described later) is included in each hierarchy in control information in a physical layer (such as TMCC information), whereby it is made possible to effectively perform processing such as channel-selecting processing. As a result, it becomes possible to operate digital television broadcasting more flexibly.

3. Control Information in Physical Layer of Present Technology (Example of Hierarchy in Present Technology)
FIG. 4 is a view for describing an example of a hierarchy in the present technology.

Figure 4:
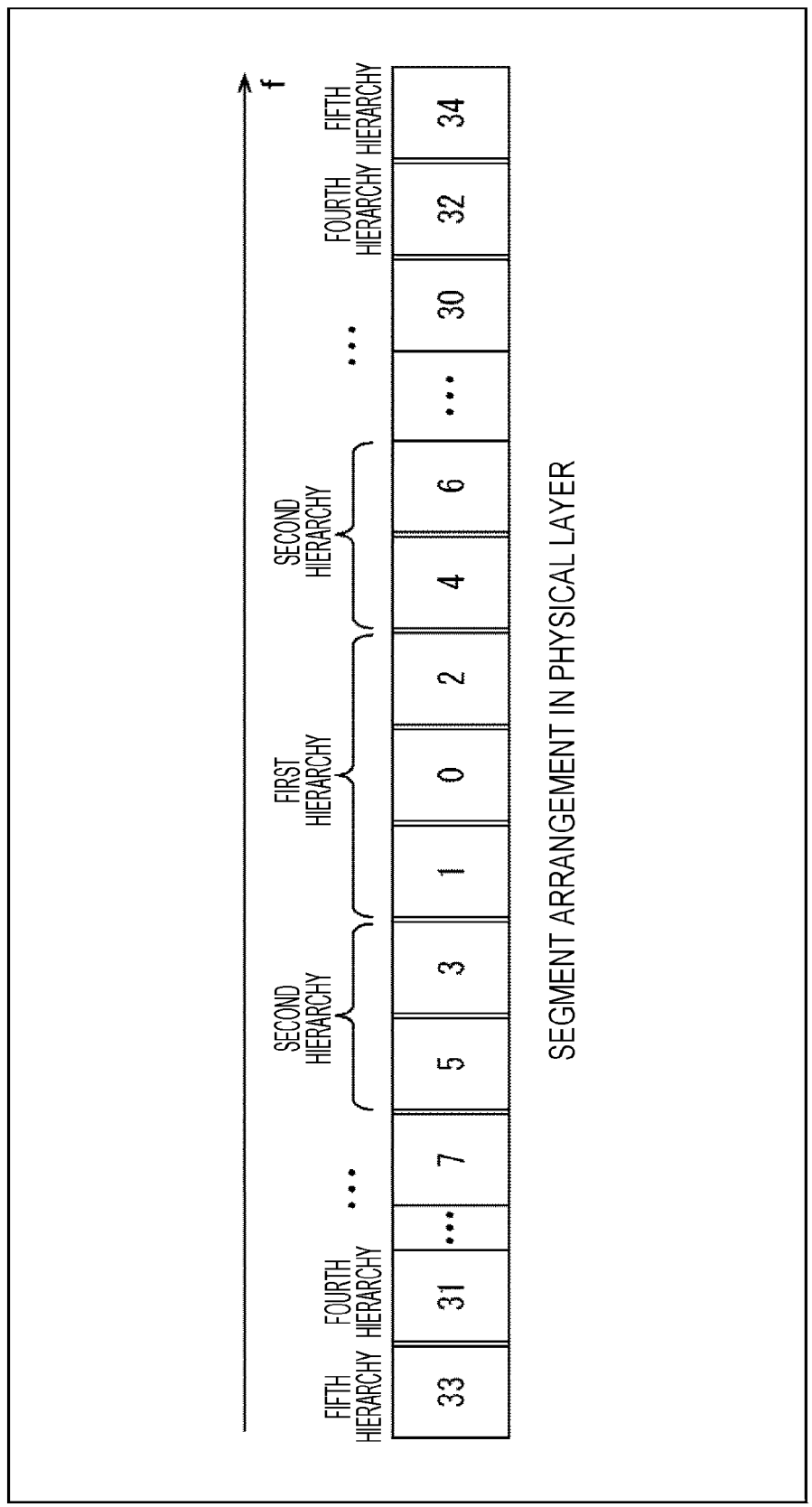
FIG. 4 is a view illustrating an example of a hierarchy in the present technology.

In FIG. 4, it is indicated that a hierarchy includes a segment expressed by a square in the drawing in a case where frequency division multiplexing (FDM) is employed and a horizontal direction is frequency f (MHz).

In other words, in a case where frequency division multiplexing (FDM) is employed, a predetermined frequency band (such as 6 MHz) is divided into a plurality of segments. In FIG. 4, frequency division into 35 segments is performed. Here, with one segment in the middle in the drawing among 35 segments being a segment #0, in a case where left and right segments thereof are respectively set as segments #1 and #2, left and right segments thereof are respectively set as segments #3 and #4, and this is repeated, one segment on the leftmost side in the drawing becomes a segment #33 and one segment on the rightmost side in the drawing becomes a segment #34.

Furthermore, a hierarchy is configured by aggregation of one or a plurality of segments. In FIG. 4, a first hierarchy includes three segments that are segments #0 to #2. Furthermore, a second hierarchy includes four segments that are segments #3 and #5 and segments #4 and #6. In FIG. 4, a description of segments #8 to #29 is omitted. However, a third hierarchy includes a plurality of 24 segments that are segments #7 to #30, and a fourth hierarchy includes two segments that are a segment #31 and a segment #32. Then, a fifth hierarchy includes two segments that are a segment #33 and a segment #34.

In such a manner, a hierarchy includes one or a plurality of segments acquired by frequency division, and it is possible to transmit data of a different service in each hierarchy, for example. With this arrangement, for example, operation in which a certain broadcasting station uses a plurality of segments becomes possible. Note that division into 13 segments is performed and the number of transmittable hierarchies is three at a maximum in existing ISDB-T. However, in the present technology, the number of transmittable segments and hierarches is increased and more hierarchies can be handled, whereby more various services can be provided.

Next, a structure of a frame in a physical layer will be described. Here, for comparison, a structure of a frame in an existing physical layer will be described first with reference to FIG. 5 and a structure of a frame in a physical layer in the present technology will be subsequently described with reference to FIG. 6.

(Structure of Frame in Existing Physical Layer)

Figure 5:
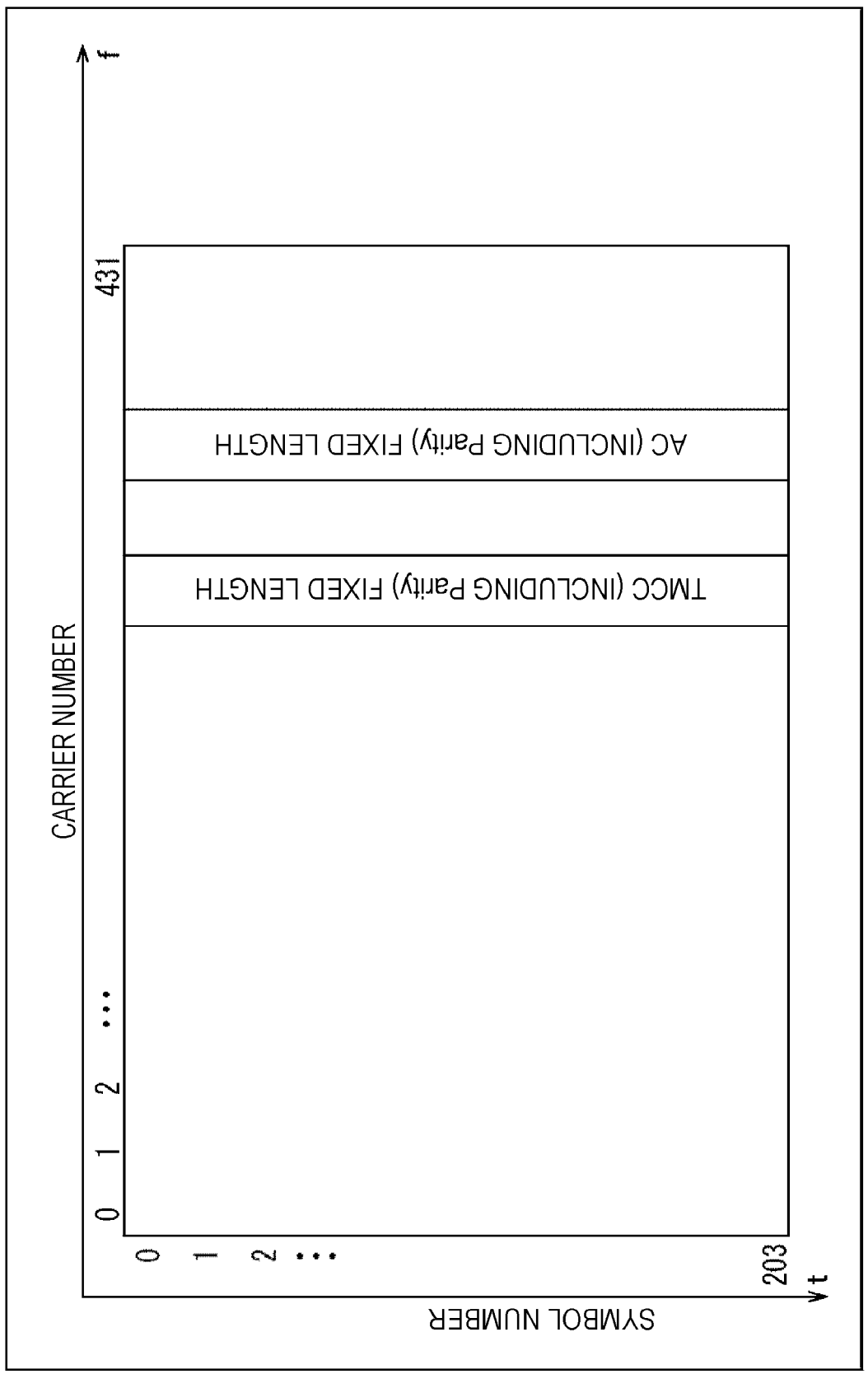
FIG. 5 is a view illustrating a structure of a frame and an arrangement of control information in an existing physical layer.

FIG. 5 is a view illustrating a structure of a frame and an arrangement of control information (signaling) in an existing physical layer.

In FIG. 5, a configuration of a segment in a case where a horizontal direction is a carrier number corresponding to a frequency direction and a vertical direction is a symbol number corresponding to time direction is illustrated. However, in a case of existing ISDB-T, a symbol number in a vertical direction is an OFDM symbol number. Furthermore, a transmission parameter varies depending on a mode. For example, in a case where a third mode is employed, the number of symbols in a frame is 204 and a carrier number is from 0 to 431.

In FIG. 5, the existing physical layer frame includes TMCC information and auxiliary channel (AC) information.

TMCC information includes, in each hierarchy, information to perform demodulation processing, decoding processing, or the like. The TMCC information is information having a fixed length. Furthermore, a parity is added to the TMCC information.

AC information is additional information related to broadcasting and includes, for example, additional information related to transmission control or earthquake warning information. AC information is information having a fixed length. Furthermore, a parity is added to the AC information.

Note that in FIG. 5, a part other than the TMCC information and the AC information is omitted. However, a carrier symbol (carrier symbol in data segment after interleaving) or a continual pilot (CP) is arranged in the part other than the TMCC information and the AC information in the physical layer frame. Furthermore, since a frame configuration in existing ISDB-T is described in "3.12 frame configuration" in Non-Patent Document 1 described above, and the like, a detailed description of contents thereof is omitted here.

(Structure of Frame in Physical Layer in Present Technology)

Figure 6:
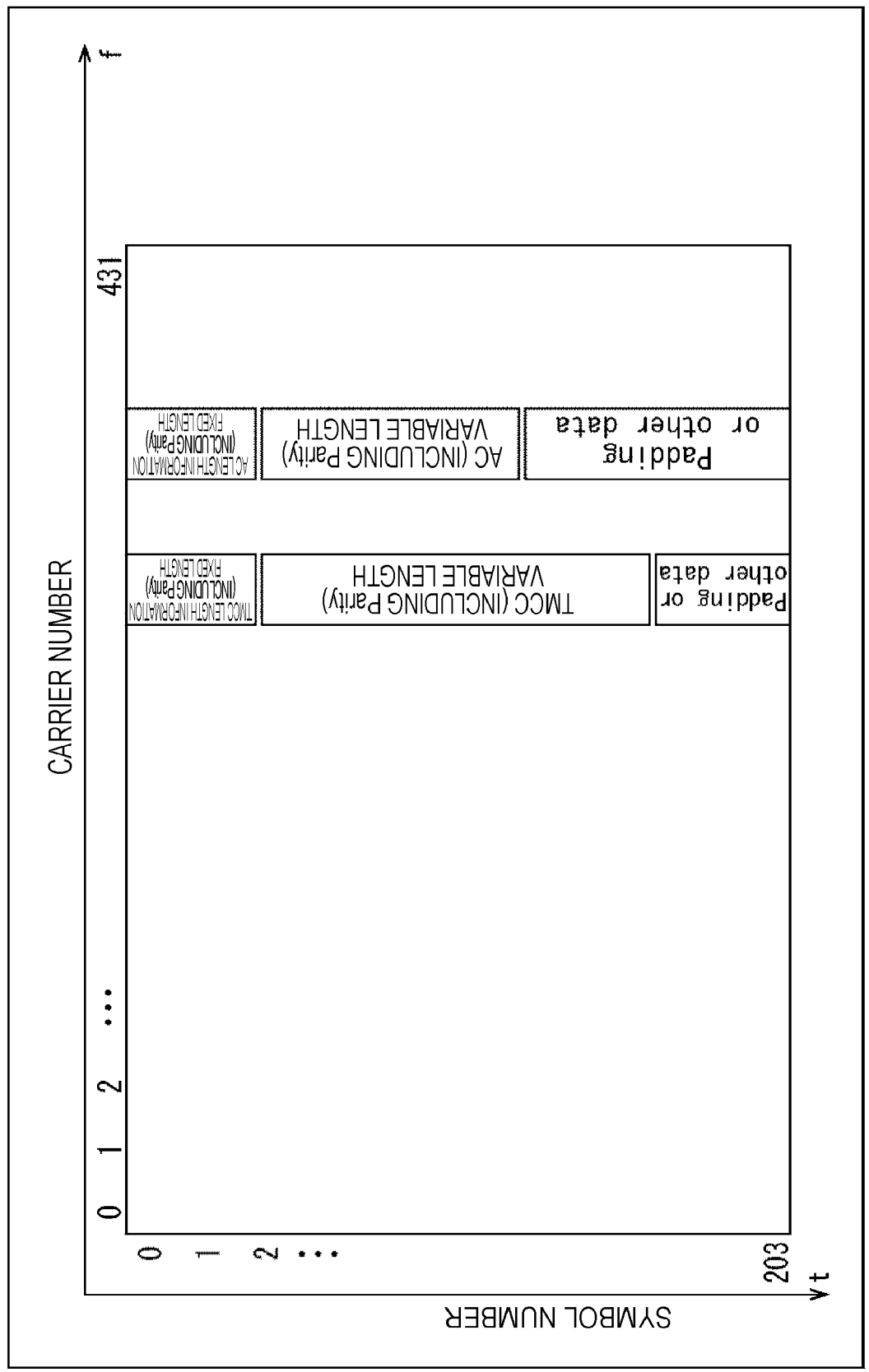
FIG. 6 is a view illustrating an example of a structure of a frame and an arrangement of control information in a physical layer in the present technology.

FIG. 6 is a view illustrating an example of a structure of a frame and an arrangement of control information (signaling) in a physical layer in the present technology.

In FIG. 6, similarly to the configuration in FIG. 5, a configuration of a segment of a case where a carrier number corresponds to a frequency direction in a horizontal direction and a vertical direction is a symbol number corresponding to a time direction is illustrated.

In FIG. 6, a physical layer frame in the present technology includes TMCC information and AC information. Note that in the following description, TMCC information in the present technology is referred to as "present-technology TMCC information" in distinction from existing TMCC information. Furthermore, AC information in the present technology is referred to as "present-technology AC information" in distinction from existing AC information.

The present-technology TMCC information includes, in each hierarchy, information to perform demodulation processing, decoding processing, or the like, information indicating existence/non-existence of control information in an upper layer of a physical layer (hereinafter, referred to as control information existence information), and the like. Since existence/non-existence of control information in an upper layer (such as TLV-SI) can be recognized in a physical layer with this control information existence information, it becomes possible to easily perform channel-selecting processing in channel selection, for example.

Furthermore, the present-technology TMCC information is information having a variable length. Therefore, in the present technology, TMCC length information having a fixed length is prescribed and a length of the present-technology TMCC information having a variable length is prescribed, whereby the present-technology TMCC information can be acquired. With this arrangement, the present-technology TMCC information can be treated as extensible information having a variable length.

A parity is added to each of the present-technology TMCC information and the TMCC length information. Furthermore, in a case where a length of data including the present-technology TMCC information and the TMCC length information is aligned in the physical layer frame, it is possible to respond thereto by performing padding or inserting the other data.

Note that detailed contents of the present-technology TMCC information will be described later with reference to FIG. 7 to FIG. 12. Furthermore, detailed contents of the TMCC length information will be described later with reference to FIG. 13.

The present-technology AC information is additional information related to broadcasting and includes, for example, additional information related to transmission control or earthquake warning information. Furthermore, the present-technology AC information is information having a variable length. Therefore, in the present technology, AC length information having a fixed length is prescribed and a length of the present-technology AC information having a variable length is prescribed, whereby the present-technology AC information can be acquired. With this arrangement, the present-technology AC information can be treated as extensible information having a variable length.

A parity is added to each of the present-technology AC information and the AC length information. Furthermore, in a case where a length of data including the present-technology AC information and the AC length information is aligned in the physical layer frame, padding is performed or the other data is inserted.

As described above, the present-technology TMCC information and the present-technology AC information are not information having a fixed length and are information having a variable length unlike the existing TMCC information and AC information. Therefore, since handling as extensible information having a variable length is possible, for example, control information existence information or the like can be easily added to the present-technology TMCC information. As a result, it is possible to operate digital television broadcasting more flexibly. Furthermore, since each of the present-technology TMCC information and the present-technology AC information has a variable length, it is possible to reduce a period until acquisition thereof in a case where a length thereof is short.

(Example of Syntax of Present-Technology TMCC Information)

FIG. 7 is a chart illustrating an example of syntax of the present-technology TMCC information illustrated in FIG. 6. Note that a modulation parameter in each hierarchy will be described with reference to FIG. 8 to FIG. 12 arbitrarily.

Offset_TLV_packet having 13 bits indicates an offset of a TLV packet from a head of a physical layer frame. This offset is in a unit of byte. Although a detail will be described later with reference to FIG. 17, in a case where a boundary of a physical layer frame and a boundary of a TLV packet are not coincident with each other, an offset value corresponding to a deviation amount therebetween can be set here.

In NUM_LAYER having six bits, the number of hierarchies is designated. As this number of hierarchies, for example, 64 hierarchies can be set at a maximum. In a hierarchical loop corresponding to the number of hierarchies designated by NUM_LAYER, num_segment, layer_fft_size, layer_mod, layer_cod, layer_gi, packet_type, and tlv_si_exist_flag in each hierarchy are respectively arranged.

In num_segment having six bits, the number of segments of an object hierarchy is designated.

In layer_fft_size having two bits, an FFT size of the object hierarchy is designated. As this FFT size, for example, 8K, 16K, 32K or the like can be designated as illustrated in FIG. 8.

In layer_mod having three bits, a carrier modulation system of the object hierarchy is designated. As this carrier modulation system, for example, QPSK, 16QAM, 64QAM-NUC, 256QAM-NUC, 1024QAM-NUC, 4096QAM-NUC, or the like can be designated as illustrated in FIG. 9.

In layer_cod having three bits, a code rate of error correction in the object hierarchy is designated. As this code rate, for example, 1/2, 2/3, 3/4, 5/6, 7/8, or the like can be designated as illustrated in FIG. 10.

In layer_gi having three bits, a guard interval in the object hierarchy is designated. As this guard interval, for example, 1/4, 1/8, 1/16, 1/32, or the like can be designated as illustrated in FIG. 11.

In packet_type having three bits, a kind of transmitted data in the object hierarchy is designated. As this kind of data, for example, an MPEG2-TS system or a TLV/MMT system is designated as illustrated in FIG. 12.

For example, in a case where the TLV/MMT system is employed as a broadcasting system of terrestrial digital television broadcasting in the next generation, "1" is set as packet_type. Furthermore, in a case where the MPEG2-TS system is employed, "0" is set as packet_type. In such a manner, since it is possible to set a kind of transmitted data by packet_type, it becomes possible to transmit pieces of data in various formats such as the TLV/MMT system and the MPEG2-TS system respectively in hierarchies.

Note that the TLV/MMT system and the MPEG2-TS system are examples of a format of transmitted data. For example, in a case where data in a different format is transmitted, it is possible to set a different kind of data by using Reserved bits of 2 to 7.

tlv_si_exist_flag having one bit is a flag indicating that control information in an upper layer is included in the object hierarchy. In other words, tlv_si_exist_flag corresponds to control information existence information. For example, in a case where "0" is set as tlv_si_exist_flag, it is indicated that control information in an upper layer is not included in the object hierarchy. On the other hand, for example, in a case where "1" is set as tlv_si_exist_flag, it is indicated that control information in an upper layer is included in the object hierarchy.

Specifically, for example, in a case where "1" is set as packet_type and "1" is set as tlv_si_exist_flag, it is indicated that TLV-SI (such as TLV-NIT, AMT) is included in the object hierarchy as control information in an upper layer in the TLV/MMT system.

Furthermore, for example, in a case where "0" is set as packet_type and "1" is set as tlv_si_exist_flag, it is indicated that program specific information (PSI) is included in the object hierarchy as control information in an upper layer in the MPEG2-TS system. This PSI includes a program association table (PAT), a network information table (NIT), a conditional access table (CAT), and the like.

In such a manner, in a case where a predetermined frequency band (such as 6 MHz) is divided and a hierarchy includes one or a plurality of segments, it is possible to set control information existence information (tlv_si_exist_flag) indicating existence/non-existence of control information in an upper layer (such as TLV-SI) in each hierarchy. Thus, for example, it becomes possible to easily perform processing such as channel-selecting processing in channel selection. Specifically, operation in which one frequency band is shared by a plurality of broadcasting stations and each broadcasting station uses a plurality of hierarchies is assumed, and it is possible to flexibly respond to such operation and to make processing such as channel-selecting processing performed easily.

The above is a field in a hierarchical loop.

Parity indicates a parity added to the present-technology TMCC information. Error detection with respect to the present-technology TMCC information is performed by cyclic redundancy check (CRC) using this parity. Note that this parity has a parity length designated by LEN_TMCC_Parity (FIG. 13) in TMCC length information described later. However, this parity length may be a fixed length previously prescribed by an object standard.

Note that in a case where unsigned integer most significant bit first (uimsbf) is designated as Mnemonic in FIG. 7, it is meant that bit operation is performed and handling as an integer number is performed. Furthermore, in a case where bit string, left bit first (bslbf) is designated, it is meant that handling as a bit string is performed. These are in a similar manner in FIG. 13 or FIG. 15 described later.

(Syntax of TMCC Length Information)

FIG. 13 is a chart illustrating an example of syntax of the TMCC length information illustrated in FIG. 6.

SYNC having 16 bits is a synchronization signal to detect a head of a physical layer frame. In (demodulation unit 212 of) a reception device 20, it becomes possible to easily determine a head of a physical layer frame with this SYNC word in processing of the physical layer frame. That is, in order to acquire existing TMCC information, it is necessary to receive a signal for a period of a frame length and a delay for the period of a frame length is generated. However, such a delay can be controlled by utilization of this SYNC word.

In LEN_TMCC having eight bits, a length of present-technology TMCC information is designated. As this length, it is possible to correspond to present-technology TMCC information of up to 256 bits. However, in a case where "0" is set as LEN_TMCC, it is meant that present-technology TMCC information is not included.

In LEN_TMCC_Parity having eight bits, a parity length of the present-technology TMCC information is designated. As this parity length, it is possible to correspond up to 256 bits. Note that in a case of being previously prescribed as a fixed value by an object standard, LEN_TMCC_Parity does not need to be designated.

In other words, in the TMCC length information, a parity length of present-technology TMCC information is designated along with a length of the present-technology TMCC information having a variable length in a case where the parity length is not prescribed as a fixed value by an object standard as information of a length related to the present-technology TMCC information.

Parity having 16 bits indicates a parity added to the TMCC length information. Error detection with respect to the TMCC length information is performed by cyclic redundancy check (CRC) using this parity. In a case where data is corrupted in this error detection, object present-technology TMCC information is discarded.

In the above manner, the TMCC length information having a fixed length is prescribed and information of a length related to the present-technology TMCC information having a variable length (LEN_TMCC, LEN_TMCC_Parity) is prescribed, whereby the present-technology TMCC information included in the physical layer frame can be acquired.

Note that in the above description, a structure of the present-technology TMCC information has been described. However, it is possible to acquire a similar effect by making a structure of control information (signaling) other than the present-technology TMCC information a structure similar to the above-described structure of the present-technology TMCC information. For example, by including control information existence information (tlv_si_exist_flag) into present-technology AC information having a variable length, it is possible to acquire an effect similar to that of a case where the control information existence information is included in the present-technology TMCC information. Furthermore, AC length information is made to have a structure similar to that of the TMCC length information, and information of a length related to the present-technology AC information is included instead of information of a length related to the present-technology TMCC information.

(Relationship Between Segment and Hierarchy)

FIG. 14 is a view illustrating a relationship between a segment and a hierarchy.

In FIG. 14, a segment arrangement in a physical layer is illustrated as A of FIG. 14, and a logical segment arrangement is illustrated as B of FIG. 14.

In A of FIG. 14, a case where frequency division multiplexing (FDM) is employed and a predetermined frequency band is divided into 35 segments is illustrated as an example of a segment arrangement in a physical layer. Here, similarly to FIG. 4 described above, one segment in the middle in the drawing among the 35 segments is set as a segment #0, left and right segments thereof are respectively set as segments #1 and #2, and the left/right relationship is repeated, whereby one segment on the leftmost side in the drawing is set as a segment #33 and one segment on the rightmost side in the drawing is set as a segment #34.

Furthermore, in B of FIG. 14, a case where a segment in each hierarchy is designated by the present-technology TMCC information illustrated in FIG. 7 is illustrated as a logical segment arrangement. In other words, in the present-technology TMCC information in FIG. 7, the number of segments in each hierarchy is designated by num_segment having six bits in a hierarchical loop. Thus, the number of segments corresponding to num_segment is designated in order of hierarchy.

Specifically, in B of FIG. 14, since a logical segment arrangement of a case where there are five hierarchies from the first hierarchy to the fifth hierarchy is illustrated, the first hierarchy includes three segments that are segments #0 to #2 in a case where segments #0 to #34 are lined up serially in a direction from a left side to a right side in the drawing.

Furthermore, among the segments #0 to #34 lined up in ascending order from the left side to the right side in the drawing, the second hierarchy includes four segments that are the segments #3 to #6, the third hierarchy includes 24 segments that are the segments #7 to #30, the fourth hierarchy includes two segments that are the segments #31 to #32, and the fifth hierarchy includes two segments that are the segments #33 to #34.

In such a manner, in a case where the present-technology TMCC information illustrated in FIG. 7 is used, each hierarchy is expressed by the logical segment arrangement illustrated in B of FIG. 14 and control information existence information (tlv_si_exist_flag) can be designated in each hierarchy. With this arrangement, in processing of present-technology TMCC information included in a physical layer frame, it is possible to easily determine that control information in an upper layer (such as TLV-SI) is not included in the fifth hierarchy while control information in an upper layer (such as TLV-SI) is included in the first to fourth hierarchies, for example.

(Different Example of Syntax of Present-Technology TMCC Information)

FIG. 15 is a chart illustrating a different example of syntax of the present-technology TMCC information illustrated in FIG. 6. Note that in FIG. 15, a description of a field that is the same with that in FIG. 7 described above is arbitrarily omitted to avoid repetition.

In FIG. 15, num_segment, layer_fft_size, layer_mod, layer_cod, layer_gi, packet_type, and tlv_si_exist_flag in each hierarchy are also arranged in a hierarchical loop corresponding to the number of hierarchies designated by NUM_LAYER.

layer_fft_size, layer_mod, layer_cod, layer_gi, packet_type, and tlv_si_exist_flag arranged in the hierarchical loop in FIG. 15 are similar to a modulation parameter, control information existence information (tlv_si_exist_flag), and the like in the hierarchical loop in FIG. 7.

On the other hand, num_segment arranged in the hierarchical loop in FIG. 15 is different from num_segment arranged in the hierarchical loop in FIG. 7. In other words, with respect to num_segment, a bit length thereof is changed from six bits to 35 bits and Mnemonic is changed from uimsbf to bslbf. With this arrangement, it is expressed that num_segment having 35 bits is handled as a bit string.

Then, each bit in the bit string of num_segment is made to correspond to one segment, whereby information related to 35 segments can be expressed by 35 bits of num_segment. With this arrangement, a segment used by each hierarchy can be designated in a unit of segment. A detailed example of that is described with reference to FIG. 16.

(Relationship Between Segment and Hierarchy)

FIG. 16 is a view illustrating a relationship between a segment and a hierarchy.

In FIG. 16, a segment arrangement in a physical layer is illustrated as A of FIG. 16, and a logical segment arrangement is illustrated as B of FIG. 16. The segment arrangement in a physical layer in A of FIG. 16 is similar to the segment arrangement in a physical layer in A of FIG. 14.

In B of FIG. 16, a case where a segment in each hierarchy is designated by the present-technology TMCC information illustrated in FIG. 15 is illustrated as a logical segment arrangement. In other words, in the present-technology TMCC information in FIG. 15, a segment used by each hierarchy is designated in a unit of segment by a bit string of 35 bits of num_segment in the hierarchical loop.

Specifically, in B of FIG. 16, since a logical segment arrangement of a case where there are five hierarchies from the first hierarchy to the fifth hierarchy is expressed, the first hierarchy includes three segments that are segments #0 to #2 in which bits are set in a bit string of 35 bits of num_segment in the first hierarchy in a case where segments #0 to #34 are lined up serially in a direction from a left side to a right side in the drawing.

Similarly, in a bit string of 35 bits of num_segment in the second hierarchy, the second hierarchy includes four segments that are segments #3 to #6 in which bits are set. Furthermore, in a bit string of 35 bits of num_segment in the third hierarchy, the third hierarchy includes 24 segments that are segments #7 to #30 in which bits are set.

Furthermore, in a bit string of 35 bits of num_segment in the fourth hierarchy, the fourth hierarchy includes two segments that are segments #31 to #32 in which bits are set. Moreover, in a bit string of 35 bits of num_segment in the fifth hierarchy, the fifth hierarchy includes two segments that are segments #33 to #34 in which bits are set.

In such a manner, in a case where the present-technology TMCC information illustrated in FIG. 15 is used, each hierarchy is expressed by the logical segment arrangement illustrated in B of FIG. 16 and control information existence information (tlv_si_exist_flag) can be designated in each hierarchy. With this arrangement, in processing of present-technology TMCC information included in a physical layer frame, it is possible to easily determine that control information in an upper layer (such as TLV-SI) is not included in the first hierarchy while control information in an upper layer (such as TLV-SI) is included in the second to fifth hierarchies, for example.

(Detailed Example of Offset of TLV Packet)

Figure 17:
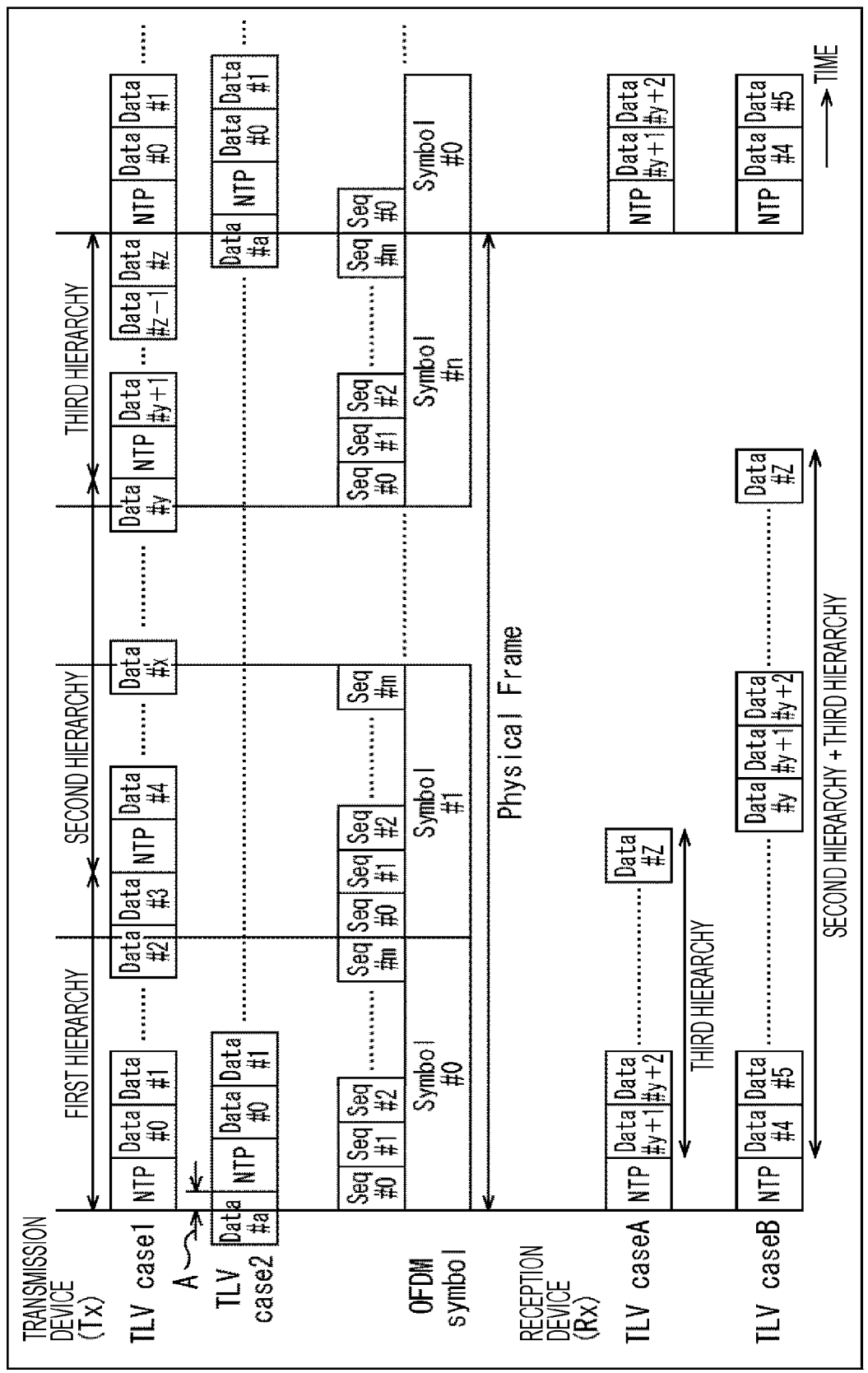
FIG. 17 is a view illustrating transmission timing of time information in a case of a plurality of hierarchies.

Next, an offset of a TLV packet (Offset_TLV_packet) included in the present-technology TMCC information illustrated in FIG. 7 and FIG. 15 will be described with reference to FIG. 17. In FIG. 17, transmission timing of time information in a case where there is a plurality of hierarchies is illustrated.

Note that in FIG. 17, it is made possible to transmit time information effectively by including, into a head of a physical layer frame (Physical Frame), time information in an NTP format which information indicates time at the head. Here, a network time protocol (NTP) is a communication protocol to synchronize, in a device connected to a network, a clock included in the device with correct time.

In FIG. 17, data processed in a transmission device 10 is schematically expressed on an upper side and data processed in a reception device 20 is schematically expressed on a lower side. Furthermore, in FIG. 17, a horizontal direction indicates time and a direction thereof is in a direction from a left side to a right side in the drawing.

First, data processed in the transmission device 10 will be described.

In FIG. 17, a TLV packet is expressed by "Data" in the drawing. Furthermore, time information is expressed by "NTP" in the drawing.

An OFDM symbol is expressed by "Symbol" in the drawing. One physical layer frame includes n+1 OFDM symbols that are a Symbol #0 to a Symbol # n. That is, this physical layer frame is a unit of transmission of data.

However, in a case where frequency division multiplexing (FDM) is employed as a system of multiplexing of a broadcast signal, an OFDM symbol is further divided in a unit of segment. A segment is expressed by "Seg" in the drawing. One OFDM symbol includes m+1 segments that are Seg #0 to Seg # m.

Here, in FIG. 17, time information is inserted in such a manner as to be at a head of a physical layer frame. This time information includes time at the head of the physical layer frame as information prescribed by an NTP.

In FIG. 17, as a case1 of a TLV packet, a case where a boundary of a physical layer frame and a boundary of the TLV packet are coincident with each other is illustrated. In this case1, since the boundaries of the physical layer frame and the TLV packet are coincident with each other, time information is inserted to a head (boundary) of the physical layer frame.

However, in the example in FIG. 17, a case where there are three hierarchies from the first hierarchy to the third hierarchy is illustrated. Thus, a TLV packet in each hierarchy among the first hierarchy to the third hierarchy is included in one physical layer frame.

Here, time information indicating time at a head of a physical layer frame is inserted with respect to each hierarchy of the first hierarchy to the third hierarchy. For example, with respect to the first hierarchy, time information is inserted to a head of a plurality of TLV packets (Data #0 to Data #3). Furthermore, for example, time information is inserted to a head of a plurality of TLV packets (Data #4 to Data # y) with respect to the second hierarchy, and time information is inserted to a head of a plurality of TLV packets (Data # y+1 to Data # z) with respect to the third hierarchy.

Furthermore, in FIG. 17, as a case2 of a TLV packet, a case where a boundary of a physical layer frame and a boundary of the TLV packet are not coincident with each other is illustrated. In this case2, since the boundaries of the physical layer frame and the TLV packet are not coincident with each other, a head (boundary) of the physical layer frame is in the middle of the TLV packet (such as Data # a) and time information is inserted after the TLV packet.

Similarly to the case1 of a TLV packet, time information indicating time at a head of a physical layer frame is inserted to each piece of data in a hierarchy (plurality of TLV packet) in the first hierarchy to third hierarchy in the case2 of a TLV packet.

In such a manner, in the transmission device 10, time information indicating time at a head of a physical layer frame is inserted to the head of the physical layer frame, and there are a case where boundaries of the physical layer frame and a TLV packet are coincident with each other and a case where the boundaries are not coincident with each other. In a case where these boundaries are not coincident with each other, an insertion position of the time information becomes a position deviated from the boundaries (position deviated for TLV packet in the middle). Then, as indicated by an arrow A in FIG. 17, an offset value corresponding to an amount of this deviation is included as an offset of the TLV packet (Offset_TLV_packet) into present-technology TMCC information (FIG. 7 or FIG. 15).

Next, data processed in the reception device 20 will be described.

As described above, time information arranged at a head of data in each hierarchy (plurality of TLV packet) is acquired from one physical layer frame along with the plurality of TLV packets. This time information indicates time at a head of the physical layer frame. In other words, time information is acquired for each hierarchy since time information indicating time at a head of a physical layer frame is inserted to a head of data in each hierarchy in a case where there is a plurality of hierarchies.

For example, in FIG. 17, as a caseA of a TLV packet, a case where only the third hierarchy among three hierarchies from the first hierarchy to third hierarchy is selected is illustrated.

In this caseA, since time information is inserted to a head of data in the third hierarchy in a case where boundaries of a physical layer frame and a TLV packet are coincident with each other in the above-described case1, it is possible to perform clock synchronization (clock recovery) in the reception device 20 with reference to time at a head of the physical layer frame which time is indicated by the time information inserted at the head of the data in the third hierarchy.

On the other hand, in this caseA, in a case where boundaries of a physical layer frame and a TLV packet are not coincident with each other in the above-described case2, an insertion position of time information becomes a position deviated from the boundary of the physical layer frame. Here, since an offset of the TLV packet (Offset_TLV_packet) is included in present-technology TMCC information, it is possible to perform clock synchronization (clock recovery) in the reception device 20 with reference to time at a head of the physical layer frame, the time being indicated by the time information inserted to a head of data in the third hierarchy, in consideration of this offset.

Furthermore, for example, in FIG. 17, as a caseB of a TLV packet, a case where the second hierarchy and the third hierarchy are selected among three hierarchies from the first hierarchy to the third hierarchy is illustrated.

In this caseB, since time information is inserted to a head of data in the second hierarchy in a case where boundaries of a physical layer frame and the TLV packet are coincident with each other in the above-described case1, it is possible to perform clock synchronization (clock recovery) in the reception device 20 with reference to time at a head of the physical layer frame which time is indicted by the time information inserted to the head of the data in the second hierarchy.

On the other hand, in this caseB, in a case where boundaries of a physical layer frame and the TLV packet are not coincident with each other in the above-described case2, an insertion position of time information becomes a position deviated from the boundary of the physical layer frame. Here, since an offset of the TLV packet (Offset_TLV_packet) is included in present-technology TMCC information, it is possible to perform clock synchronization (clock recovery) in the reception device 20 with reference to time at a head of the physical layer frame, the time being indicated by time information inserted to a head of data in the second hierarchy, in consideration of this offset.

Note that the caseA and the caseB of a TLV packet described herein are examples. For example, even in a case where all hierarchies among the first hierarchy to third hierarchy are selected, it is possible to similarly perform clock synchronization with reference to time at a head of a physical layer frame which time is indicted by time information inserted in each hierarchy.

In such a manner, not only in a case where boundaries of a physical layer frame and a TLV packet are coincident with each other but also in a case where boundaries of a physical layer frame and a TLV packet are not coincident with each other, clock synchronization by time information such as an NTP is realized between the transmission device 10 and the reception device 20 by utilization of an offset of a TLV packet (Offset_TLV_packet) included in present-technology TMCC information, and it becomes possible in the reception device 20 to process a plurality of TLV packets with respect to each piece of time information included at a head of data in a hierarchy.

4. Flow of Present-Technology TMCC Information Correspondence Processing

Next, a flow of processing on a transmission side and a reception side by utilization of present-technology TMCC information will be described with reference to a flowchart in FIG. 18.

Figure 18:
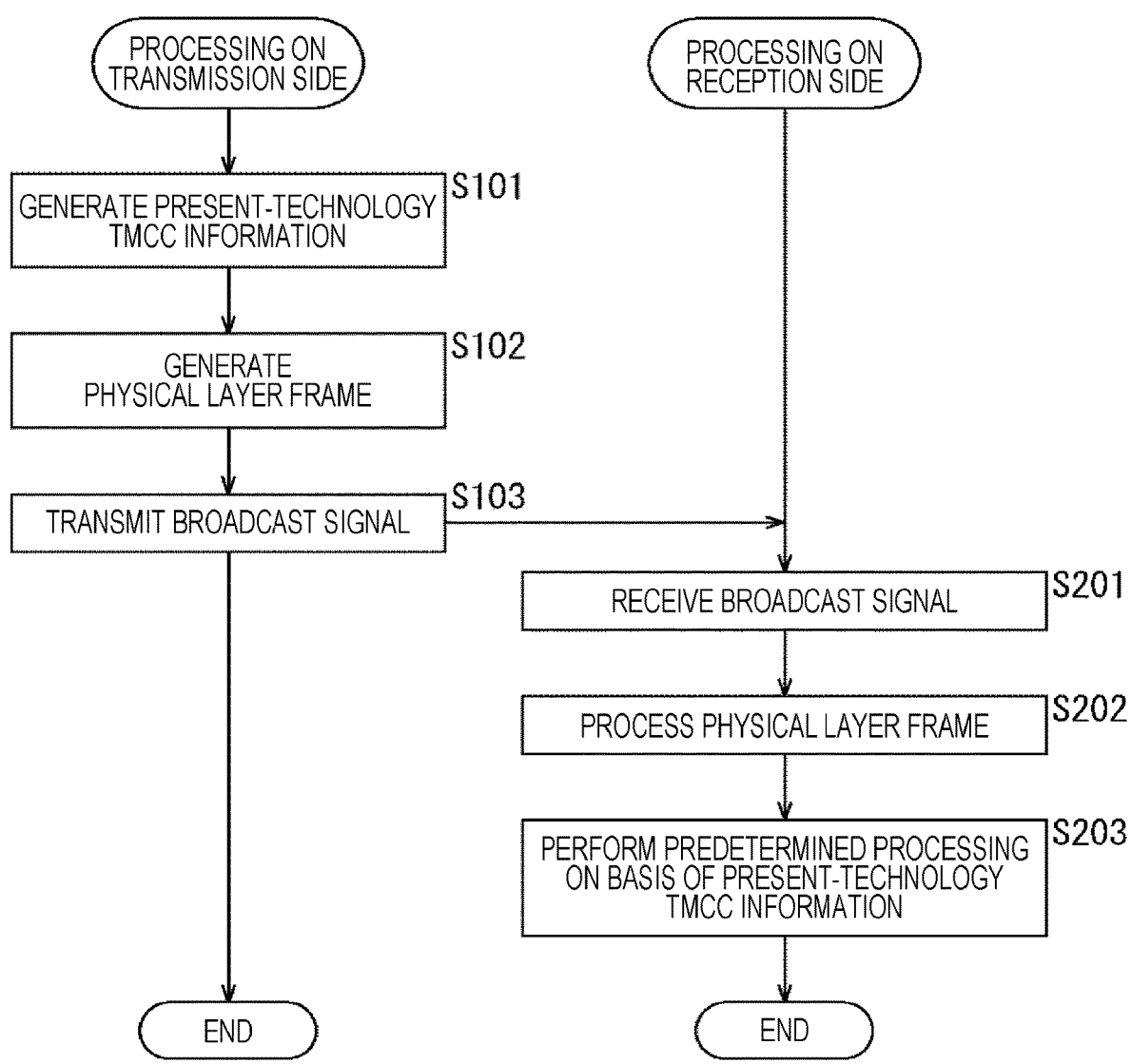
FIG. 18 is a flowchart for describing present-technology TMCC information correspondence processing.

Note that in FIG. 18, processing in Step S101 to S103 is processing on the transmission side which processing is executed by the transmission device 10 in FIG. 1. Furthermore, processing in Step S201 to S203 is processing on the reception side which processing is executed by the reception device 20 in FIG. 1.

In Step S101, the control information generation unit 112 generates present-technology TMCC information. Here, the present-technology TMCC information includes, for each hierarchy, a modulation parameter, control information existence information indicating existence/non-existence of control information in an upper layer (such as TLV-SI or the like), and the like.

In Step S102, the frame generation unit 113 generates a physical layer frame including the present-technology TMCC information generated in the processing in Step S101. However, as illustrated in FIG. 6, in the physical layer frame generated in the processing in Step S102, TMCC length information having a fixed length is arranged with respect to the present-technology TMCC information having a variable length.

In Step S103, the modulation unit 114 performs necessary processing with respect to the physical layer frame generated in the processing in Step S102 and transmits, through the antenna 121, a broadcast signal acquired thereby.

In Step S201, the RF unit 211 receives, through the antenna 221, the broadcast signal transmitted from the transmission device 10.

In Step S202, the demodulation unit 212 processes a physical layer frame acquired from the broadcast signal received in the processing in Step S201. By processing of this physical layer frame, present-technology TMCC information including control information existence information indicating existence/non-existence of control information in an upper layer is acquired. However, as illustrated in FIG. 6, in the physical layer frame processed in Step S202, TMCC length information having a fixed length is arranged with respect to the present-technology TMCC information having a variable length. Thus, the present-technology TMCC information is acquired according to information included in the TMCC length information (LEN_TMCC, LEN_TMC-C_Parity).

In Step S203, the demodulation unit 212 performs predetermined processing on the basis of the present-technology TMCC information acquired in the processing in Step S202.

Here, for example, it is possible to determine, with respect to each hierarchy, whether there is control information in an upper layer according to the control information existence information included in the present-technology TMCC information. Thus, by processing data in a hierarchy in which it is determined that the control information in an upper layer exists, it is possible to acquire the control information in an upper layer (such as TLV-SI or the like). Then, in the processing unit 213 in the following stage, channel-selecting processing or the like can be performed on the basis of the control information in an upper layer (such as TLV-SI or the like) acquired in such a manner.

In such a manner, control information existence information indicating existence/non-existence of control information in an upper layer is included, for each hierarchy, in present-technology TMCC information that is control information (signaling) in a physical layer, whereby it is possible to determine a hierarchy including the control information in an upper layer in a plurality of hierarchies. Thus, for example, processing such as channel-selecting processing can be performed promptly and easily.

In the above, a flow of the present-technology TMCC information correspondence processing has been described.

5. Modification Example

In the above description, integrated services digital broadcasting (ISDB) that is a system employed in Japan and the like has been described as a standard of digital television broadcasting. However, the present technology may be applied to advanced television systems committee (ATSC) that is a system employed in the US and the like, or digital video broadcasting (DVB) that is a system employed in European countries and the like, for example.

In other words, although time division multiplexing (TDM) is employed as a system of multiplexing a broadcast signal in ATSC or DVB instead of frequency division multiplexing (FDM), application of the present technology is possible even in a case where time division multiplexing (TDM) is employed. Furthermore, the above-described hierarchy can be considered as a physical layer pipe (PLP) conceptually. In this case, it is possible to say that a plurality of hierarchies is multiple-PLPs (M-PLP).

Furthermore, as a standard of digital television broadcasting, application to standards of satellite broadcasting using broadcasting satellite (BS), communications satellite (CS), or the like, cable broadcasting such as a cable television (CATV), and the like is also possible in addition to terrestrial broadcasting.

Furthermore, the above-described appellation such as a packet, a frame, or control information is just an example and there is a case where a different appellation is used. However, a difference in these appellations is simply a formal difference and there is no difference in actual contents of an object packet, frame, control information, or the like. For example, there is a case where a TLV packet is referred to as an ATSC link-layer protocol (ALP) packet, a generic packet, or the like. Furthermore, there is a case where a frame and a packet are used for the same meaning.

In the above description, a case where information of time prescribed by an NTP is used as time information has been described. However, this is not the limitation and, for example, arbitrary time information such as information of time prescribed by a precision time protocol (PTP) or a third generation partnership project (3GPP), information of time included in global positioning system (GPS) information, or other information of time determined uniquely can be used.

Furthermore, in the above description, it has been described that time information indicates time at a head of a physical layer frame. However, this is not the limitation and time in a different position of a stream may be indicated. Furthermore, in a case where a structure of providing a preamble to a physical layer frame is employed, time information may be included in the preamble.

Furthermore, the present technology can be also applied to a predetermined standard or the like prescribed on the assumption that a transmission path other than a broadcasting network, that is, for example, a communication line (communication network) such as the Internet, a telephone network, or the like is used as a transmission path (standard other than standard of digital television broadcasting). In that case, a communication line such as the Internet or a telephone network is used as a transmission path 30 of a transmission system 1 (FIG. 1), and a transmission device 10 can be a server provided on the Internet. Then, the communication server and a reception device 20 perform bidirectional communication through the transmission path (communication line).

6. Configuration of Computer

Figure 19:
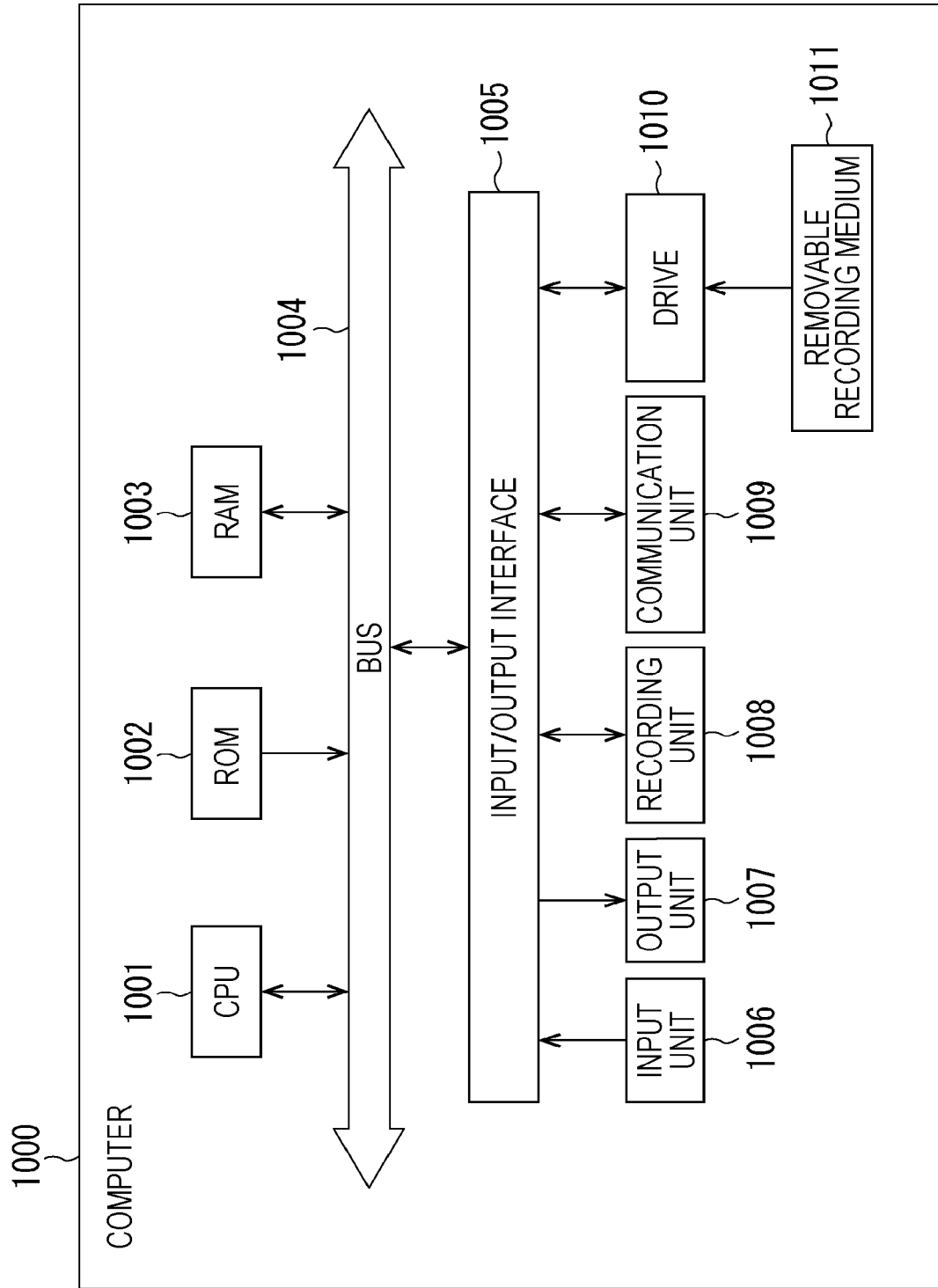
FIG. 19 is a view illustrating a configuration example of a computer.

The above-described series of processing can be executed by hardware or by software. In a case where the series of processing is executed by software, a program included in the software is installed into a computer. FIG. 19 is a view illustrating a configuration example of hardware of a computer that executes the above-described series of processing with a program.

In a computer 1000, a central processing unit (CPU) 1001, a read only memory (ROM) 1002, and a random access memory (RAM) 1003 are connected to each other by a bus 1004. An input/output interface 1005 is further connected to the bus 1004. To the input/output interface 1005, an input unit 1006, an output unit 1007, a recording unit 1008, a communication unit 1009, and a drive 1010 are connected.

The input unit 1006 includes a keyboard, a mouse, a microphone, or the like. The output unit 1007 includes a display, a speaker, or the like. The recording unit 1008 includes a hard disk, a nonvolatile memory, or the like. The communication unit 1009 includes a network interface or the like. The drive 1010 drives a removable recording medium 1011 such as a magnetic disk, an optical disk, a magneto optical disk, or a semiconductor memory.

In the computer 1000 configured in the above manner, the CPU 1001 loads a program recorded in the ROM 1002 or the recording unit 1008 into the RAM 1003 through the input/ output interface 1005 and the bus 1004 and executes the program, whereby the above-described series of processing is performed.

For example, the program executed by the computer 1000 (CPU 1001) can be recorded in the removable recording medium 1011 as a package medium or the like and provided. Furthermore, the program can be provided through a wired or wireless transmission medium such as a local area network, the Internet, or digital satellite broadcasting.

In the computer 1000, it is possible to install the program into the recording unit 1008 through the input/output interface 1005 by mounting the removable recording medium 1011 to the drive 1010. Furthermore, the program can be received in the communication unit 1009 through the wired or wireless transmission medium and can be installed into the recording unit 1008. In addition, the program can be previously installed in the ROM 1002 or the recording unit 1008.

Here, in the present description, processing performed by the computer according to the program is not necessarily performed in a time series in order described in a flowchart. In other words, the processing performed by the computer according to the program includes processing executed in parallel or individually (such as parallel processing or processing by object). Furthermore, the program may be processed by one computer (processor) or processed in a distributed manner by a plurality of computers.

Note that an embodiment of the present technology is not limited to the above-described embodiment and various modifications can be made within the spirit and the scope of the present technology.

Furthermore, the present technology may include the following configurations.

(1)

A reception device including:

a reception unit configured to receive a broadcast signal transmitted by frequency division multiplexing (FDM); and a processing unit configured to process, on the basis of control information existence information that is information included in first control information, which is acquired from the broadcast signal and is control information in a physical layer, and that indicates existence/non-existence of second control information that is control information in an upper layer of the physical layer, the second control information transmitted in each hierarchy.

(2)

The reception device according to (1), in which the first control information includes the control information existence information for each hierarchy.

(3)

The reception device according to (2), in which the first control information is information that has a variable length and that is included in a frame in the physical layer.

(4)

The reception device according to (3), in which the frame in the physical layer includes length information indicating a length of the first control information.

(5)

The reception device according to (4), in which the length information includes a synchronization signal to detect a head of the frame in the physical layer.

(6)

The reception device according to any one of (2) to (5), in which the hierarchy includes one or a plurality of segments, and the first control information includes information indicating the number of segments for each hierarchy.

(7)

The reception device according to any one of (2) to (5), in which the hierarchy includes one or a plurality of segments, and the first control information includes, for each hierarchy, information with which a segment used by the hierarchy can be designated in a unit of segment.

(8)

The reception device according to any one of (2) to (7), in which at a head of the frame in the physical layer, time information indicating time at the head is included, and in a case where a boundary of the frame in the physical layer and a boundary of a packet included in the frame in the physical layer are deviated from each other, the first control information includes an offset corresponding to an amount of the deviation.

(9)

The reception device according to any one of (1) to (8), in which the first control information is control information including a modulation parameter in each hierarchy, and the second control information is control information of a variable-length packet including an Internet protocol (IP) packet.

(10)

A data processing method of a reception device, including steps of:

receiving a broadcast signal transmitted by frequency division multiplexing (FDM); and processing, on the basis of control information existence information that is information included in first control information, which is acquired from the broadcast signal and is control information in a physical layer, and that indicates existence/non-existence of second control information that is control information in an upper layer of the physical layer, the second control information transmitted in each hierarchy, receiving and processing being performed by the reception device.

(11)

A transmission device including:

a generation unit configured to generate first control information that is control information in a physical layer and that includes control information existence information indicating existence/non-existence of second control information that is control information in an upper layer of the physical layer; and a transmission unit configured to transmit a broadcast signal including the first control information and the second control information by frequency division multiplexing (FDM).

(12)

The transmission device according to (11), in which the first control information includes the control information existence information for each hierarchy.

(13)

The transmission device according to (12), in which the first control information is information that has a variable length and that is included in a frame in the physical layer.

(14)

The transmission device according to (13), in which the frame in the physical layer includes length information indicating a length of the first control information.

(15)

The transmission device according to (14), in which the length information includes a synchronization signal to detect a head of the frame in the physical layer.

(16)

The transmission device according to any one of (12) to (15), in which the hierarchy includes one or a plurality of segments, and the first control information includes information indicating the number of segments for each hierarchy.

(17)

The transmission device according to any one of (12) to (15), in which the hierarchy includes one or a plurality of segments, and the first control information includes, for each hierarchy, information with which a segment used by the hierarchy can be designated in a unit of segment.

(18)

The transmission device according to any one of (12) to (17), in which at a head of the frame in the physical layer, time information indicating time at the head is included, and in a case where a boundary of the frame in the physical layer and a boundary of a packet included in the frame in the physical layer are deviated from each other, the first control information includes an offset corresponding to an amount of the deviation.

(19)

The transmission device according to any one of (11) to (18), in which the first control information is control information including a modulation parameter in each hierarchy, and the second control information is control information of a variable-length packet including an IP packet.

(20)

A data processing method of a transmission device, including steps of:

generating first control information that is control information in a physical layer and that includes control information existence information indicating existence/non-existence of second control information that is control information in an upper layer of the physical layer; and transmitting a broadcast signal including the first control information and the second control information by frequency division multiplexing (FDM), generating and transmitting being performed by the transmission device.

REFERENCE SIGNS LIST

1 Transmission system
10 Transmission device
20 Reception device
30 Transmission path
111 Packet processing unit
112 Control information generation unit
113 Frame generation unit
114 Modulation unit
211 RF unit
212 Demodulation unit
213 Processing unit
1000 Computer
1001 CPU

The invention claimed is:

1. A reception device comprising:

reception circuitry configured to receive a broadcast signal transmitted according to frequency division multiplexing (FDM) in a frequency band, the frequency band including at least a control channel and plural frequency segments, the frequency segments being arranged into plural hierarchies, and each of the hierarchies including one or more of the frequency segments; and processing circuitry configured to:

obtain, from the broadcast signal, first control information in the control channel, the first control information including segment information indicating a number of frequency segments for each of the hierarchies, and control information existence information indicating existence/non-existence of second control information included in each of the hierarchies, the second control information included in a particular hierarchy including information for obtaining data packets included in the particular hierarchy; and perform channel selection according to the control information existence information.

2. The reception device according to claim 1, wherein the first control information has a variable length and is included in a physical layer frame.

3. The reception device according to claim 2, wherein the physical layer frame includes length information indicating a length of the first control information.

4. The reception device according to claim 3, wherein the physical layer frame includes a synchronization signal for detecting a start position of the physical layer frame.

5. The reception device according to claim 2, wherein each of the hierarchies includes time information indicating a time corresponding to a start position of the physical layer frame, and in a case that the start position of the physical layer frame start position of a collection of data packets included in the hierarchies that corresponds to the physical layer frame are deviated from each other by an amount of deviation, the first control information indicates an offset corresponding to the amount of deviation.

6. The reception device according to claim 1, wherein the first control information indicating modulation parameters for each of the hierarchies.

7. The reception device according to claim 1, wherein the first control information indicates a number of the hierarchies included in the broadcast signal.

8. The reception device according to claim 1, wherein the data packets included in the particular hierarchy are Internet protocol (IP) packets.

9. A data processing method of a reception device, comprising steps of:

receiving, by reception circuitry of the reception device, a broadcast signal transmitted according to frequency division multiplexing (FDM) in a frequency band, the frequency band including at least a control channel and plural frequency segments, the frequency segments being arranged into plural hierarchies, and each of the hierarchies including one or more of the frequency segments;

obtaining, by processing circuitry of the reception device from the broadcast signal, first control information in the control channel, the first control information including
- segment information indicating a number of frequency segments for each of the hierarchies, and
- control information existence information indicating existence/non-existence of second control information included in each of the hierarchies, the second control information included in a particular hierarchy including information for obtaining data packets included in the particular hierarchy; and performing, by the processing circuitry of the reception device, channel selection according to the control information existence information.

10. A transmission device comprising:
processing circuitry configured to generate first control information to be included in a control channel in a frequency band,
- the frequency band including at least the control channel and plural frequency segments, the frequency segments being arranged into plural hierarchies, and each of the hierarchies including one or more of the frequency segments, and
- the first control information including
  - segment information indicating a number of frequency segments for each of the hierarchies, and
  - control information existence information indicating existence/non-existence of second control information included in each of the hierarchies, the second control information included in a particular hierarchy including information for obtaining data packets included in the particular hierarchy; and transmission circuitry configured to transmit a broadcast signal according to frequency division multiplexing (FDM) in the frequency band, the broadcast signal including the first control information in the control channel and the second control information in the corresponding one or more of the hierarchies consistent with the control information existence information included in the first control information.

11. The transmission device according to claim 10, wherein the first control information has a variable length and is included in a physical layer frame.

12. The transmission device according to claim 11, wherein the physical layer frame includes length information indicating a length of the first control information.

13. The transmission device according to claim 12, wherein the physical layer frame includes a synchronization signal for detecting a start position of the physical layer frame.

14. The transmission device according to claim 11, wherein
- each of the hierarchies includes time information indicating a time corresponding to a start position of the physical layer frame, and
- in a case that the start position of the physical layer frame and a start position of a collection of data packets included in the hierarchies that corresponds to the physical layer frame are deviated from each other by an amount of deviation, the first control information indicates an offset corresponding to the amount of deviation.

15. The transmission device according to claim 10, wherein the first control information indicating modulation parameters for each of the hierarchies.

16. The transmission device according to claim 10, wherein the first control information indicates a number of the hierarchies included in the broadcast signal.

17. The transmission device according to claim 10, wherein the data packets included in the particular hierarchy are Internet protocol (IP) packets.

18. A data processing method of a transmission device, comprising steps of:
generating, by processing circuitry of the transmission device, first control information to be included in a control channel in a frequency band,
- the frequency band including at least the control channel and plural frequency segments, the frequency segments being arranged into plural hierarchies, and each of the hierarchies including one or more of the frequency segments, and
- the first control information including
  - segment information indicating a number of frequency segments for each of the hierarchies, and
  - control information existence information indicating existence/non-existence of second control information included in each of the hierarchies, the second control information included in a particular hierarchy including information for obtaining data packets included in the particular hierarchy; and transmitting, by transmission circuitry of the transmission device, a broadcast signal according to frequency division multiplexing (FDM) in the frequency band, the broadcast signal including the first control information in the control channel and the second control information in the corresponding one or more of the hierarchies consistent with the control information existence information included in the first control information.

* * * * *